United States Patent Office 3,471,791
Patented Oct. 7, 1969

3,471,791
SYLLABIC DETECTOR SYSTEM
Robert Walter Alister Scarr, Stansted, and George John Preston Barnes and Donald Anthony Acott Roworth, Harlow, England, assignors to International Standard Electric Corporation, New York, N.Y., a corporation of Delaware
Filed July 19, 1967, Ser. No. 654,593
Claims priority, application Great Britain, July 25, 1966, 33,341/66
Int. Cl. H03d 1/18
U.S. Cl. 329—101
15 Claims

ABSTRACT OF THE DISCLOSURE

The invention provides a syllabic detector system which utilizes a half wave D.C. feedback amplifier with excellent linearity of input A.C. peak to D.C. output. The system employs a short time constant for charging and up to three different discharge time constants which are connected in turn into the output circuit to provide an output signal which is a smoothed rectified envelope of the speech waveform appearing at the input of the detector system. If found necessary the detector system may be temperature compensated by including a thermistor in the feedback amplifier circuit.

---

The invention relates to an envelope detector system.

The invention provides an envelope detector system comprising a half wave D.C. feedback amplifier having its output resistance shunted by a capacitance which is instantaneously charged to the peak values of the speech waveform applied to the input of the detector system and partially discharged via said output resistance, and means for providing at least one other discharge path for said capacitance, wherein said other discharge paths which each have a different discharge rate which is greater than the discharge rate through said output resistance are connected into the output circuit of the detector system in turn to provide an output signal which is a smoothed rectified envelope of the waveform appearing at the input of the detector system.

The foregoing and other features according to the invention will be understood from the following description with reference to the accompanying drawings, in which.

Figure 1:
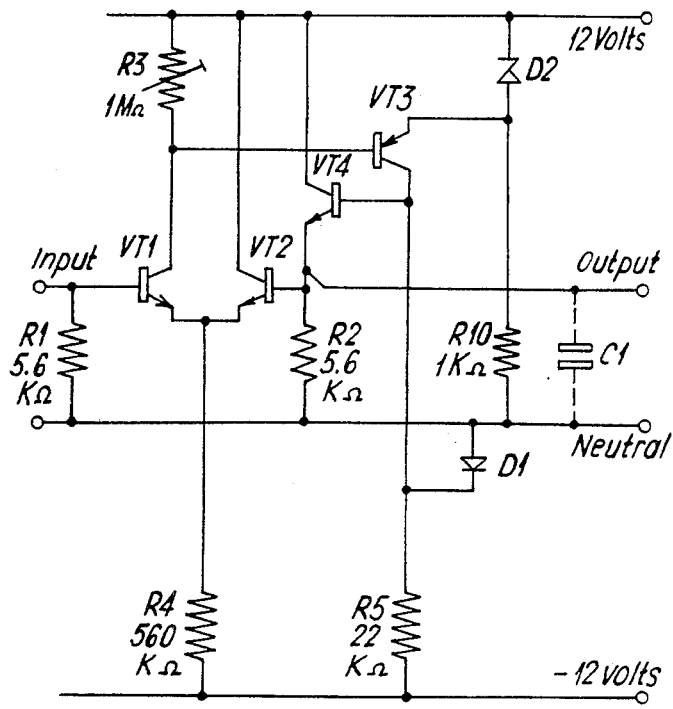
FIGURE 1 shows the circuit diagram of a transistorized rectifier circuit with typical component values indicated.

Referring to FIGURE 1, a transistorized rectifier circuit according to the invention is shown with typical component values indicated and comprises transistors VT1, VT2, VT3 and VT4. The emitters of transistors VT1 and VT2 have a common biasing resistance R4 connected to the −12 volts supply line, the collector of the transistor VT1 being connected to the +12 volts supply line via a variable resistance R3 while the collector of the transistor VT2 is connected directly to the +12 volts supply line. The variable resistance R3 is used to align the bias of the rectifier circuit to the correct value, such that there is zero output for no signal input.

The base of the transistor VT2 is connected to the emitter of the transistor VT4, to the neutral supply line via a resistance R2 and to the output terminal of the rectifier circuit.

The collector of the transistor VT1 is connected to the base of the transistor VT3 the collector of which is connected to the base of the transistor VT4, to the −12 volts supply line via a resistance R5 and to the neutral supply line via a diode D1.

The collector of the transistor VT4 is connected directly to the +12 volts supply line and the emitter of the transistor VT3 is also connected to the +12 volts supply line via a diode D2, for example, a Zener diode, and to the neutral supply line via a resistance R10.

The input to the rectifier circuit is applied via the base of the transistor VT1 which is connected to the neutral supply line via a resistance R1.

The rectifier circuit shown in the drawing according to FIGURE 1 is a half wave D.C. feedback amplifier with a voltage gain of unity. If the resistance R2 were connected to the −12 volts supply line instead of the neutral supply line the circuit would be merely an amplifier with a gain of unity and with a very low output impedance. By connecting the resistance R2 to the neutral supply line, signals applied to the base of the transistor VT1 which are negative going will result in the transistors VT3 and VT4 being cut off as the feedback attempts to maintain the base of the transistor VT2 at the same potential as that of the input signal applied to the base of the transistor VT1.

When the transistor VT4 is cut off the transistor VT2 is effectively operating in a grounded base mode, its base being grounded through the resistance R2. If the input signal continues to go more negative than the base-emitter voltage of the transistor VT2, the transistor VT1 will also cut off, and the current through the transistor VT2 will input signal.

For signals positive with respect to ground the circuit remains linear throughout up to overload and maintains the output at the emitter of the transistor VT4 equal to the input signal voltage.

With a sinewave input to the circuit a half wave rectified signal appears at the emitter of the transistor VT4, with the non-conducting half cycle of the sinewave input giving a very small potential positive with respect to ground, due to the base current of the transistor VT2 flowing through the resistance R2. With the component values indicated, this base current is of the order of 0.1 microamp giving a reverse potential of the order of 0.56 millivolt.

The addition of a capacitance C1 (which is shown with dotted connections in the drawing according to FIGURE 1) connected between the output terminal and the neutral supply line results in an envelope detector with a very fast charging rate (<1 m.sec.) but with a long discharge time constant given by C1R2 ($\approx$ 130 milliseconds).

The output voltage cannot follow the input voltage faithfully with this long time constant even for positive half cycles of the input signal and results in the transistors VT3 and VT4 being cut off as soon as the input signal becomes more negative than the charge on the capacitance C1. As this happens the collector of the transistor VT3 goes negative rapidly until the collector signal is caught by the diode D1. This collector signal may be used for determining the start of any timing or to initiate the delay before connection of the fast discharge time constant.

The circuit diagram shown in the drawing according to FIGURE 1, the diode D1 being replaced by a transistor VT5.

The base of the transistor VT5 is connected to the junction between the base of the transistor VT4 and the collector of the transistor VT3 while the emitter is connected to the neutral supply line. The collector of the transistor VT5 is connected to the −12 volts supply line via a resistance R6 and to the base of the transistor VT6 whose collector is connected directly to the −12 volts supply line.

The emitter of the transistor VT6 is connected to the neutral supply line via a diode D3 and a capacitance C2 and to the +12 volts supply line via the diode D3 and a resistance R7.

The junction between the resistance R7 and the diode D3 is connected via a diode D4 to the base of a transistor VT7, the emitter of which is connected directly to the neutral supply line while the collector is connected to the output terminal via a resistance R8.

The junction between the diode D4 and the base of the transistor VT4 is connected to the neutral supply line via a resistance R9.

Figure 2:
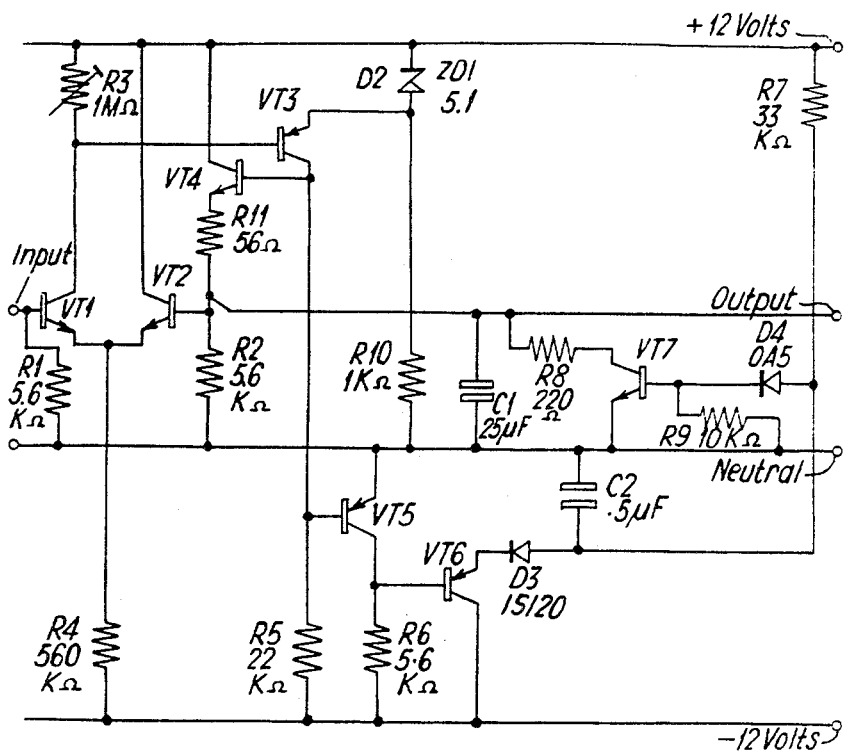
FIGURE 2 shows the circuit diagram of an envelope detector system with two discharge time constants which utilizes the transistorized rectifier circuit shown in the drawing according to FIGURE 1.

Typical component values are given for the components used in the circuit diagram shown in the drawing according to FIGURE 2.

In order to limit the reverse base-emitter voltage for the transistors VT1 and VT2 it may be found necessary to introduce a diode in the base circuits of these transistors. Also, the circuit arrangements shown in the drawings according to FIGURES 1 and 2 may be varied without loss of performance by eliminating the diode D2 and the resistance R10 and connecting the emitter of the transistor VT3 directly to the +12 volts supply line. It would be necessary in this instance to decrease the value of the variable resistance R3 in order to maintain the same current flow in the transistor VT1.

The resistance R1 need not necessarily be connected to the neutral supply line, it could for example be connected to the slider arm of a variable resistance which is connected in series with a fixed resistance between the neutral and either the −12 volts supply line or the +12 volts supply line in order to vary the threshold level of the circuit, i.e. varies the potential at which the capacitance C1 begins to charge.

The transistor VT5 is turned on as soon as the transistor VT3 is turned off and the transistor VT6 is turned off as its base follows the collector of the transistor VT5 thereby allowing the capacitance C2 to be charged towards the +12 volts supply through the resistance R7.

After a short interval of time, determined by the time constant C2R7, the potential at the base of the transistor VT7 applied via the diode D4 becomes sufficiently positive to cause the transistor VT7 to conduct thus switching in the resistance R8 across the capacitance C1, to provide a rapid discharge of the order of 5 milliseconds which is determined by the time constant C1× (effective resistance derived from the resistance R2 in parallel with the resistance R8 in series with the saturation resistance of the transistor VT7).

As soon as the voltage across the capacitance C1 becomes more negative than the input signal voltage, the transistors VT3 and VT4 conduct again to recharge the capacitance C1. This causes the transistor VT5 to be turned off and therefore the transistor VT6 to conduct allowing the capacitance C2 to be rapidly recharged through the diode D3 to a potential near to the −12 volts supply and thus the transistor VT7 is turned off.

The diode D4 prevents a negative bias appearing on the base of the transistor VT7, which would cause a leakage current to flow from the capacitance C1 and result in a slightly negative bias at the output terminal for no signal input. The resistance R9 ensures that the base of the transistor VT7 is grounded when the transistor is not conducting and the diode D3 ensures that the base of the transistor VT7 goes sufficiently positive when it is intended to be conducting, and also ensures that this transistor is rapidly turned off as soon as the transistor VT6 conducts.

Figure 4:
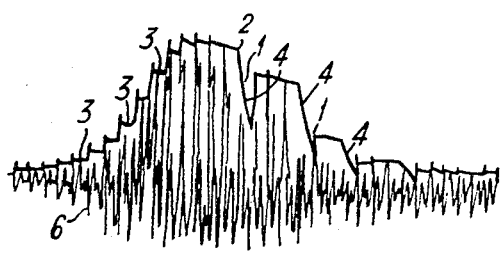
FIGURE 4 illustrates the envelope of a speech waveform which appears at the output of the circuit diagram shown in the drawing according to FIGURE 2.

This circuit arrangement therefore provides two discharge time constants resulting in a satisfactory smoothing of a voiced frequency waveform and the provision of a faithfully reproduced envelope 2 of the speech waveform 6 at the output of the detector system as shown in the drawing according to FIGURE 4.

It can be seen from the drawing according to FIGURE 4 that for signals positive with respect to ground the envelope 2 follows the input speech waveform 6, each positive going spike charges the capacitance C1 with a very fast charging rate and between spikes the capacitance C1 discharges with a time constant C1R2 (≃130 milliseconds) as shown at 3 in the drawing until the next positive going spike reaches a potential at least equal to the remaining charge on the capacitance C1, the capacitance is then recharged to a value equal to the magnitude of this spike.

The other discharge time constant which is switched in by the action of the transistors VT5, VT6 and VT7 as previously outlined is shown at 4 in the drawing according to FIGURE 4. When this discharge time constant operates between positive going spikes discontinuities 1 occur in the envelope 2 as shown in the drawing.

Figure 5:
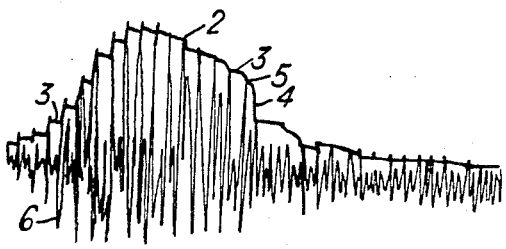
FIGURE 5 illustrates the envelope of a speech waveform which appears at the output of the circuit diagram shown in the drawing according to FIGURE 3.

If a third discharge time constant is added to the circuit diagram shown in the drawing according to FIGURE 2 with a value between the 130 millisecond and the 5 millisecond time constants already existing with this circuit, the resulting envelope 2 derived will be much improved and the discontinuities 1 in the envelope 2 shown in the drawing according to FIGURE 4 will be eliminated as shown in the drawing according to FIGURE 5.

Figure 3:
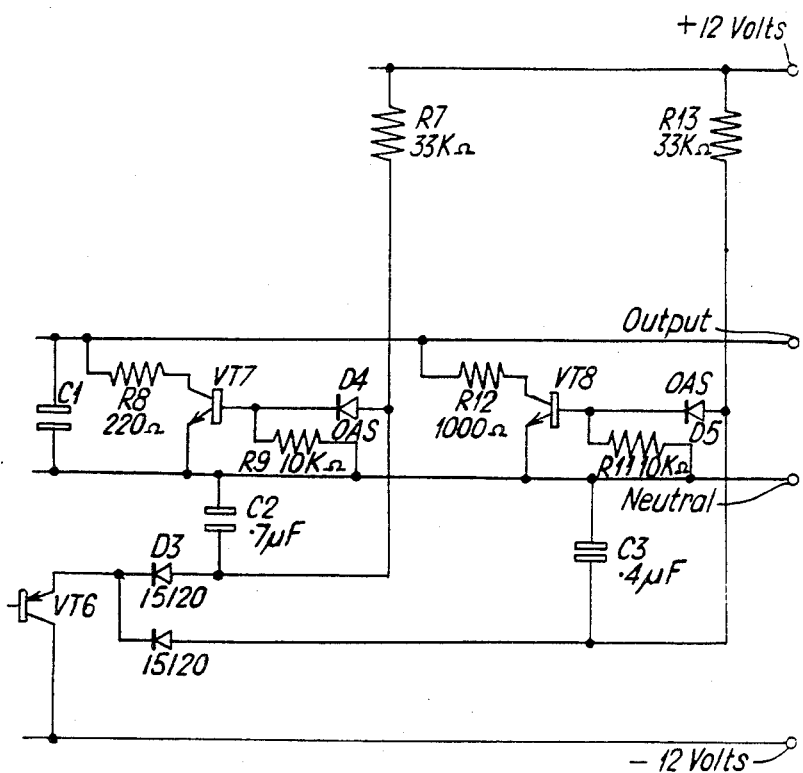
FIGURE 3 shows part of the circuit diagram shown in the drawing according to FIGURE 2 together with the additional circuitry for the addition of a third discharge time constant.

FIGURE 3 shows part of the circuit diagram shown in the drawing according to FIGURE 2 together with the additional components for the third discharge time constant and typical component values are indicated. The additional components are the transistor VT8 network, the diode D5 and the capacitance C3.

The base of the transistor VT8 is connected to the +12 volts supply line via a diode D5 and a resistance R13, to the neutral supply line via a resistance R11 and to the emitter of the transistor VT6 via the diode D5 and a diode D6, while the emitter is connected directly to the neutral supply line and the collector to the output terminal via a resistance R12.

The junction between the diodes D5 and D6 is connected to the neutral supply line via a capacitance C3.

It will be seen from the circuit diagram shown in the drawing according to FIGURE 3 that a third time constant of approximately 25 milliseconds as represented by C1× (effective resistance derived from the resistance R2 in parallel with the resistance R12 in series with the saturation resistance of the transistor VT8) has been introduced after a delay of the order of 10 milliseconds (C3R13), and that the original time delay (C2R11) before bringing in the time constant which is of the order of 5 milliseconds and represented by C1× (effective resistance derived from the resistance R2 in parallel with the resistance R8 in series with the saturation resistance of the transistor VT7 and the resistance R12 in series with the saturation resistance of the transistor VT8) has been increased to approximately 20 milliseconds by increasing the value of the capacitance C2.

This results in a smoother response to vowel sounds, particularly on the trailing edges as shown in the drawing according to FIGURE 5. In this drawing the third discharge time constant which is shown at 5 on the envelope 2 and is of the order of 25 milliseconds is switched into the circuit between the slow (130 milliseconds) and the fast (5 milliseconds) time constants and successfully eliminates the discontinuities 1 shown in the drawing to FIGURE 4.

The transistors VT7 and VT8 shown in the drawings according to FIGURES 2 and 3 could be replaced by field effect transistors and in this arrangement using the circuit associated with the transistor VT7 as an example, the gate electrode of the field effect transistor would be connected to the junction between the resistance R7 and the diode D3 via the diode D4 and to the neutral supply line via the resistance R9 while the source and drain electrodes of the field effect transistor would be connected in series with the resistance R8 between the neutral supply line and the output terminal.

It may be found necessary to change the 10 millisecond and the 20 millisecond time delays before switching in the 25 millisecond and the 5 millisecond time constants to a value less than the period of the fundamental larynx tone frequency in order to obtain efficient smoothing, for example with a fundamental larynx tone frequency of the order of 70 cycles per second the 20 millisecond time delay would need to be reduced to say 15 milliseconds and with a fundamental larynx tone frequency of the order of 120 cycles per second the 10 millisecond time delay would need to be reduced to say 8 milliseconds.

For noise envelope detection the delays and time constants may be altered to suit the noise being monitored in order to obtain a closer approximation to the time envelope.

The estimated drift with temperature variations for this circuit arrangement is of the order of 0.34 millivolt per degree centigrade which may be compensated for completely by replacing part of the resistance R3 shown in the drawing according to FIGURE 2 by a thermistor.

The invention therefore provides a rectifier circuit with excellent linearity of input A.C. peak to output D.C. voltage which may be used as part of an envelope detector system with either two or three discharge time constants. Extra discharge time constants may be added if found necessary by adding additional transistor or field effect transistor networks which shunt resistances across the capacitance C1 when required and which are connected to the emitter of the transistor VT6 via a diode as shown in the drawing according to FIGURE 3.

The rectifier circuit allows for easy extraction of information leading to the connection of the fast discharge time constant, for alteration of that time constant and the linearity of the circuit is of the order of 60 to 70 db.

The circuit diagrams shown in the drawings according to FIGURES 1, 2 and 3 could of course be arranged to use reverse polarity transistors and power supplies.

It is to be understood that the foregoing description of specific examples of this invention is made by way of example only and is not to be considered as a limitation on its scope.

What we claim is:

1. An envelope detector system comprising a half wave D.C. feedback amplifier having its output resistance shunted by a capacitance which is instantaneously charged to the peak values of the speech waveform applied to the input of the detector system and partially discharged via said output resistance, and means for providing at least one other discharge path for said capacitance, wherein said other discharge paths which each have a different discharge rate which is greater than the discharge rate through said output resistance are connected into the output circuit of the detector system in turn to provide an output signal which is a smoothed rectified envelope of the waveform appearing at the input of the detector system.

2. An envelope detector system as claimed in claim 1 wherein said half wave D.C. feedback amplifier comprises a first and a second transistor having a common emitter biasing resistance connected to the negative supply line, the collector of said first transistor being connected to the positive supply line via a variable resistance and to the base of a third transistor while the collector of the second transistor is connected directly to the positive supply line, and a fourth transistor having its emitter connected to the base of the second transistor and to the neutral supply line via said output resistance, its base connected to the collector of said third transistor and the negative supply line via a resistance, and its collector connected directly to the positive supply line, wherein the emitter of said third transistor is provided with biasing means, wherein the input to the detector system is applied via the base of said first transistor while the output is taken across said output resistance, and wherein the threshold level of said detector system is fixed by the biasing means applied to the base of said first transistor.

3. An envelope detector system as claimed in claim 2 wherein said means for biasing the emitter of said third transistor is provided either by connecting said emitter to the positive supply line or by connecting said emitter to the junction of a diode and a resistance which are connected in series between the positive and the neutral supply lines, the cathode of said diode being connected to the positive supply line.

4. An envelope detector system as claimed in claim 3 wherein means are provided to limit the reverse base-emitter voltage of said first and second transistors.

5. An envelope detector system as claimed in claim 4 wherein said means for limiting the reverse base-emitter voltage of said first and second transistors is provided by a diode in each of the base circuits of said first and second transistors.

6. An envelope detector system as claimed in claim 5 wherein the biasing means applied to the base of said first transistor is provided by a resistance connected between the neutral supply line and said base.

7. An envelope detector system as claimed in claim 5 wherein the biasing means applied to the base of said first transistor is provided by a variable resistance connected in series with a fixed resistance between the neutral and either the positive or negative supply line, the slider of said variable resistance being connected to said base via a resistance.

8. An envelope detector system as claimed in claim 7 wherein the voltage gain of said half wave D.C. feedback amplifier is unity.

9. An envelope detector system as claimed in claim 8 wherein said other discharge paths for said capacitance are connected into the output circuit of the detector system by providing a fifth transistor having its base connected to the junction between the base of said fourth transistor and the collector of said third transistor, its collector connected to the negative supply line via a biasing resistance and to the base of a sixth transistor, and its emitter connected to the neutral supply line, the collector of said sixth transistor being connected to the negative supply line while its emitter is connected to each of the means which provides said other discharge paths for said capacitance via a first diode and time delay means.

10. An envelope detector system as claimed in claim 9 wherein said time delay means are provided by a capacitance and a resistance connected in series between said positive and neutral supply lines, the junction of said capacitance and resistance being connected to said first diode and to the means for providing a discharge path for said capacitance via a second diode.

11. An envelope detector system as claimed in claim 10 wherein each of said means for providing a discharge path for said capacitance is provided by a transistor having its emitter connected to said neutral supply line, its base connected to said second diode and to said neutral supply line via a first resistance, and its collector connected to the output terminal via a second resistance which provides a discharge path for said capacitance when said transistor is turned on.

12. An envelope detector system as claimed in claim 11 wherein each of said means for providing a discharge path for said capacitance is provided by a field effect transistor having its gate electrode connected to said second diode and to said neutral supply line via a first resistance, and its source and drain electrodes connected in series with a second resistance between said neutral supply line and the output terminal, and wherein said second resistance provides a discharge path for said capacitance when said field effective transistor is turned on.

13. An envelope detector system as claimed in claim 3 wherein said diode is provided by a Zener diode.

14. An envelope detector system as claimed in claim 12 wherein said detector system is provided with temperature compensating means.

15. An envelope detector system as claimed in claim 14 wherein said temperature compensating means is provided by a thermistor which is connected in series with the variable resistant in the collector circuit of said first transistor, the value of said variable resistance being reduced by an amount equal to the normal resistive value of said thermistor.

References Cited

UNITED STATES PATENTS

Re. 23,288  10/1950  Krumhansl et al. ___ 325—487 X

ROY LAKE, Primary Examiner

LAWRENCE J. DAHL, Assistant Examiner

U.S. Cl. X.R.

179—1; 325—487; 330—26